Aug. 15, 1967   H. SEIDEN ET AL   3,336,515
VARIABLE CAPACITOR WITH A TORQUE MECHANISM
Filed June 28, 1966   2 Sheets-Sheet 1

INVENTORS.
HUGO SEIDEN
HERZ HIRSCHBERG
BY
Ostrolenk, Faber, Gerb & Soffen
ATTORNEYS INVENTORS.
HUGO SEIDEN
HERZ HIRSCHBERG
BY
Ostrolenk, Faber, Gerb & Soffen
ATTORNEYS

United States Patent Office 3,336,515
Patented Aug. 15, 1967

3,336,515
VARIABLE CAPACITOR WITH A TORQUE MECHANISM
Hugo Seiden, Brooklyn, and Herz Hirschberg, Queens, N.Y., assignors, by mesne assignments, to Stratford Retreat House, White Plains, N.Y., a religious organization of New York
Filed June 28, 1966, Ser. No. 561,089
7 Claims. (Cl. 317—249)

This invention relates to trimmer capacitors, and more specifically relates to a novel torque mechanism for trimmer capacitors which incorporates easily manufactured elements and insures a constant preadjusted torque against rotation of an operating member which adjusts the position of the movable electrode of the capacitor.

Trimmer capacitors are well known to the art, and generally comprise a first electrode which can be moved by the rotation of a threaded adjustment member with respect to a second and fixed electrode. The dielectric medium between the two movable electrodes can be either air or a suitable solid dielectric, and the movable member can be a piston which moves with or without rotation.

In such arrangements, it is desirable to require that a certain amount of torque be applied to the adjustment mechanism before the adjustment mechanism can be moved in order to prevent accidental adjustment of the movable electrode position. It is further desirable to take up any backlash that may exist between the threaded connections between the adjustment member and the main capacitor support.

For this purpose, it is common practice to provide a suitable spring which presses the threads of the rotatable member into engagement with the threads in the bushing, or other support structure receiving the rotatable member. Such an arrangemen will, therefore, absorb backlash and require the application of some torque beyond a predetermined value before the rotatable member can be turned.

The present invention provides a novel construction for capturing such a spring between the adjustment member and a disk or pad which is threaded onto the adjustment member with both the pad, the adjustment member, and the spring rotating as a common unit when the device is to be adjusted.

It is a primary object of this invention to provide a novel torque mechanism for adjustable capacitors which is inexpensive and reliable.

Another object of this invention is to provide a novel torque mechanism for trimmer capacitors in which the adjustment spring is initially compressed to some preset value, and is thereafter held to this exact compressed configuration over the full adjustment range of the capacitor.

A still further object of this invention is to provide a novel adjustment mechanism for trimmer capacitors which includes a spring for absorbing backlash and imparting a predetermined torque requirement for rotation of the adjustment mechanism wherein the spring is not included in the torque transmitting path of the mechanism.

These and other objects of this invention will become apparent from the following description when taken in connection with the drawings, in which.

Figure 1:
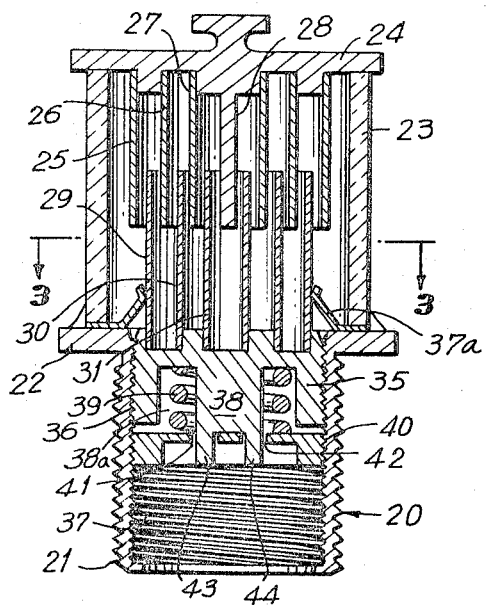
FIGURE 1 is a cross-sectional view of a first embodiment of the invention in connection with an air dielectric capacitor.
Figure 3:
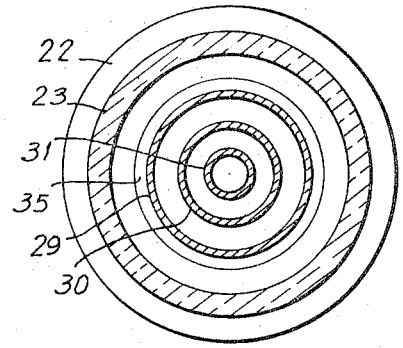
FIGURE 3 is a cross-sectional view of the capacitor of FIGURE 1 taken across the lines 3—3 in FIGURE 1.
Figure 4:
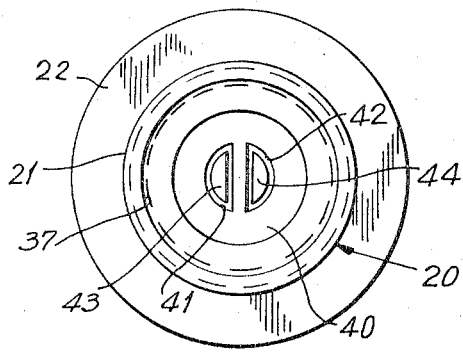
FIGURE 4 is a bottom view of the capacitor of FIGURE 1.

Referring first to FIGURES 1 through 4, we have illustrated therein an air dielectric capacitor which includes a main support bushing 20 having a threaded exterior surface 21 and a mounting flange 22. The mounting flange 22 receives one end of a ceramic insulation tube 23, and the upper end of tube 23 is capped by a conductive turret cap 24. The turret cap 24 then has soldered or brazed thereto stationary electrode cylinders 25, 26 and 27 along with a central conductive projection 28.

As will be later described, movable electrodes comprised of conductive cylinders 29, 30 and 31 are nested between stationary electrodes 25 through 28, and are axially movable with respect thereto in order to adjust the degree of overlap of these elements, thereby to adjust the capacitance between the respective groups of electrodes. Each of conductive cylinders 29, 30 and 31 are electrically and mechanically connected to a conductive rotor 35 which has an exterior thread 36 which is threaded into an interior thread 37 in bushing 20. A suitable wiper contact 37a extending from bushing 20 can also be used to insure good electrical contact between bushing 20 and electrodes 29, 30 and 31.

Rotor 36 then has a centrally projecting shaft 38 to define an interior annular well 38a which receives the spring 39.

In accordance with the invention, a tension nut 40 which has an exterior thread which is threaded into thread 37 is provided with two apertures 41 and 42 which have semicircular shapes which receive the bifurcated legs 43 and 44, respectively, at the end of the circular shaft section 38. The tension nut 40 then serves to compress spring 39 within well 38a, depending upon the spacing between tension nut 40 and the lower section of the outer rim of rotor 35. The portions of bifurcated legs 43 and 44 which extend beyond the lower surface of tension nut 40 then serve as a suitable tool-receiving means, where, for example, a screwdriver can be inserted in the slot defined between legs 43 and 44 in order to rotate the rotor 35.

Since both rotor 35 and tension nut 40 are connected together by virtue of the extension of legs 43 and 44 through openings 41 and 42, respectively, of the tension nut, it is clear that the rotor 35, nut 40 and spring 39 will rotate as a complete unit to move the electrodes 29, 30 and 31 into and out of overlapping relationship with stationary electrodes 26, 27 and 28. Moreover, the spring 39 will absorb backlash in the threaded connection between rotor 35 and threads 37 and between the threads of tension nut 40 and threads 37.

Finally, some predetermined torque dependent upon the degree of compression of spring 39 will now be required to rotate the rotor 35 and the rotor will not be accidentally moved after once being adjusted.

As an important feature of the novel torque mechanism illustrated in FIGURES 1 through 4, it will be seen that the parts are relatively simple in construction and are extremely easy to assemble. Moreover, the arrangement is such that the spring 39 does not serve as a part of the mechanical force transmitting linkage so that the spring 39 can be chosen solely for its compressional force characteristics.

While the novel torque mechanism of the invention is shown in FIGURES 1 through 4 for application to an air dielectric capacitor, it will be apparent that the invention could also be applied to other types of capacitors such as the piston trimmer capacitor.

Figure 5:
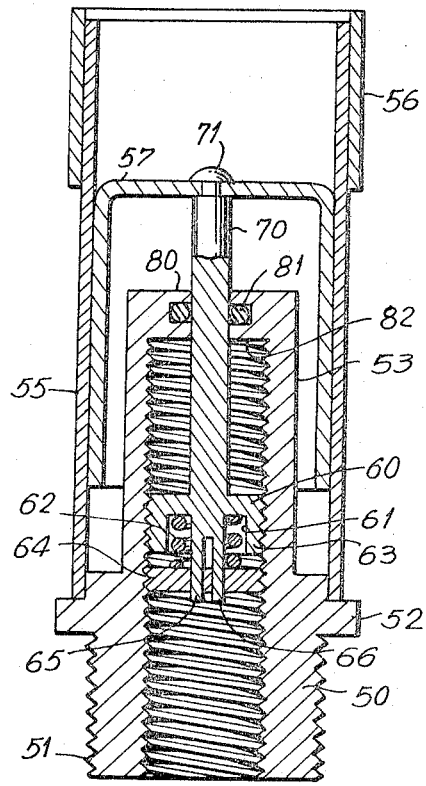
FIGURE 5 is a cross-sectional view of a second embodiment of the invention illustrating the application of the novel torque mechanism to a piston trimmer capacitor.

FIGURE 5 shows in cross-section the manner in which a standard piston trimmer capacitor could be modified to incorporate the present invention along with other novel features including a flexible connection between the piston and the piston support structure. It is to be noted that FIGURE 5 illustrates the type of piston trimmer capacitor in which the piston rotates. However, the novel mechanism of the invention could also be applied to that type of trimmer capacitor which incorporates the so-called direct travel type of mechanism in which the piston moves axially without rotation, as disclosed in copending application Ser. No. 183,512, filed Mar. 29, 1962 in the name of Hugo Seiden entitled Direct Travel Mechanism and assigned to the assignee of the instant invention.

Referring now to FIGURE 5, the capacitor is comprised of a conductive support bushing 50 which has the usual external thread 51 and flange 52.

Bushing 50 then has an upper extending section 53 with an internal thread 54 extending almost completely along the interior of bushing 51 to the bottom thereof. A dielectric tube 55 is then secured to the top of flange 52 in any desired manner, and the upper portions of dielectric tube 55 are metallized, as illustrated by metallized layer 56 to define the fixed electrode of the capacitor.

A conductive piston 57 is then contained within dielectric tube 55 and defines the movable electrode of the capacitor with the capacitance depending upon the relative position of piston 57 with respect to electrode 56.

In the embodiment of FIGURE 5, a conductive rotor 60 having a lower section fashioned in a manner subtantially identical to that described in FIGURES 1 through 4 is provided with the previously mentioned annular cavity defined by cavity 61 between the centrally extending shaft portion 62 and outer walls 63. Clearly, the exterior of section 63 is threaded to be threadedly engaged with thread 54.

A flat tension nut 64 is then provided for compressing spring 63 within the chamber 61 as described, for example, in FIGURE 1, while the bifurcated legs 65 and 66 extend through aligned openings in pressure disk 64. Thus, the torque mechanism is substantially identical to that described in FIGURE 1.

The upper end of the rotating member 60, however, is then provided with an extension 70 which is secured to piston 57 in any desired manner as by staking at the head 71.

Preferably, the extending shaft portion 70 is relatively flexible, whereupon it should be of a relatively small diameter. This flexibility will then permit the piston 57 to follow a non-linear path without causing binding between the piston 57 and the dielectric tube 55, if the piston 57 or interior of tube 55 have eccentricities which would prevent exact linear movement of the center of shaft 70.

Additional support is provided for the relatively flexible extension 70 which is comprised of the reduced upper diameter portion 80 of bushing extension 53. This reduced diameter portion 80 is then equipped with a suitable sealing ring 81 which forms a hermetic seal between bushing extension 53 and the interior of the capacitor. Note that the upper end of dielectric tube 55 can be suitably enclosed to complete this hermetic enclosure.

The reduced diameter portion 80 further defines an interior shoulder 82 which can also serve as a stop against excessive upward movement of rotor 60.

Figure 2:
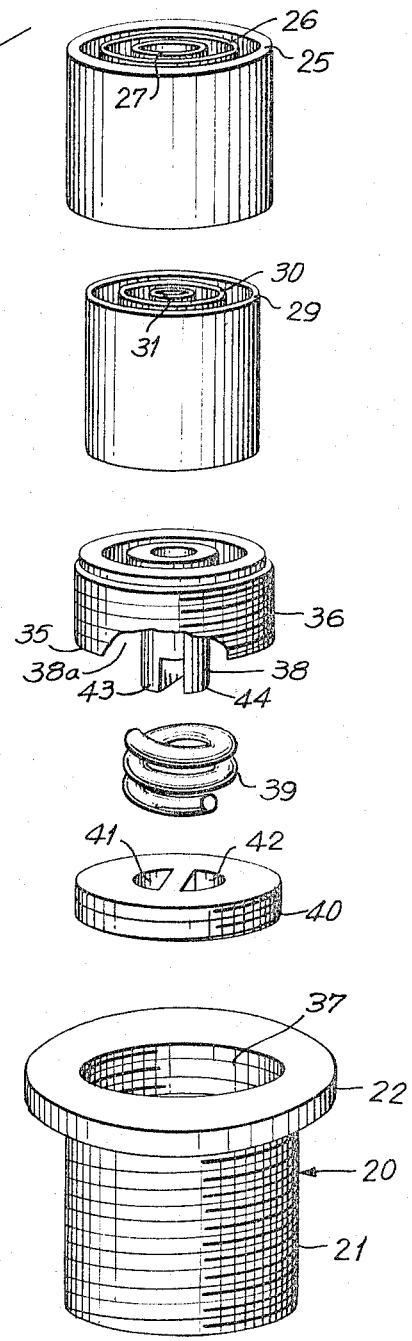
FIGURE 2 is an exploded perspective view of the torque mechanism portion of FIGURE 1.
Figure 6:
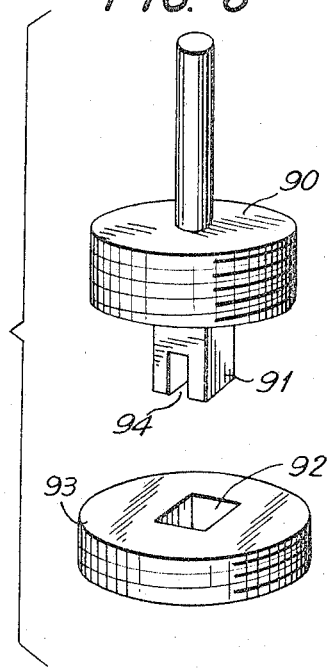
FIGURE 6 illustrates the configuration which can be assumed by a third embodiment of the invention wherein a square shaft extends completely through the pressure disk with the square shape serving the keying action.

While FIGURES 1 and 2 illustrate the novel torque mechanism of the invention as requiring a bifurcated member extending through cooperating openings in the pressure disk, this keying action could be obtained in other ways. For example, FIGURE 6 illustrates a rotor 90 which has a construction substantially identical to that of FIGURE 5, which has a square-shaped centrally extending shaft portion 91 which extends through a square-shaped opening 92 in its cooperating pressure disk 93. Note that a tool-receiving slot 94 is placed in shaft 91 and will be accessible on the bottom side of disk 93 for adjustment of the capacitor. The arrangement of FIGURE 6 will thus be able to contain a torque adjusting spring (not shown) in a manner similar to that described in FIGURES 1 and 5 with the square shaping of the shaft 91 and opening 92 serving the keying action, causing members 90 and 93 to rotate as a unit.

Figure 7:
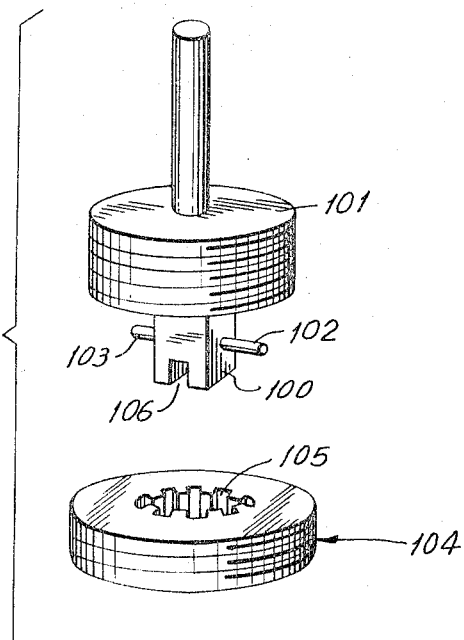
FIGURE 7 illustrates a still further embodiment of the invention wherein a disk having key slots therein cooperates with a keying projection extending from the slotted shaft extending through the key slots.

Another manner in which this keying could be obtained is illustrated in FIGURE 7 where the square shaft 100 of rotor 101 is similar to that shown in FIGURE 6, but has a pair of extending projections 102 and 103 extending from either side of the shaft 100. This could be formed by the insertion of a pin through an opening in shaft 100.

The pressure disk 104 then has a gear-shaped internal opening 105 therein, wherein the distance between the bottoms of diametrically opposite slots is slightly greater than the distance between the opposite ends of projections 102 and 103. Note that while opening 105 is shown in FIGURE 7 to have eight grooves, any desired number of grooves could be used.

When using the arrangement of FIGURE 7, the spring is compressed between members 104 and 101 in the usual manner, and the keying or interlocking between the two members is obtained by having the projections 102 and 103 nest into opposite slots in the opening 105. The tool-receiving slot 106 in shaft 100 will still be accessible beyond the bottom of disk 104 in the manner previously described.

The arrangement of FIGURE 7 has the advantage of permitting very close adjustment of the spring torque, since the spacing between the opposite spring-receiving surfaces of members 101 and 104 can be adjusted to within one-eighth of the pitch of the thread in the interior of the bushing which receives members 101 and 104.

In the embodiments of FIGURES 1 and 2, the maximum adjustment possible would only be one-half this pitch, while the arrangement of FIGURE 6 would permit adjustment to within one-fourth of the thread pitch.

Numerous other possible arrangements which come within the scope of the invention will be immediately suggested to those skilled in the art, which could include a pair of crossed slots in the pressure disk 104, and the like.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A torque mechanism for a trimmer capacitor; said trimmer capacitor including a conductive bushing support having an internally threaded opening therethrough; a conductive rotor member having external threads received in said internally threaded opening; a stator electrode mounted in spaced insulated relation from said bushing; a movable electrode spaced adjacent to said stator electrode; said movable electrode electrically and mechanically connected to said rotor at one end thereof and moved with respect to said stator electrode responsive to rotation of said rotor; and an insulation cylinder enclosing one end of said internally threaded opening in said conductive bushing; said movable electrode contained in the interior of said insulation cylinder; the other end of said rotor facing the other end of said opening in said conductive bushing and outwardly of the interior of said capacitor; said other end of said rotor having a central projection; said torque mechanism including a tension nut adjacent said other end of said rotor having an external thread received in said internally threaded opening of said bushing; and a compression spring extending around said projection and captured between said other end of said rotor and said tension nut; said tension nut having a central opening means receiving said projection therethrough; the portion of said projection extending through said tension nut having a tool-receiving means; and keying means keying said other end of said rotor to said tension nut whereby rotation of said rotor to change the axial position thereof by tool means applied to said tool-receiving means rotates said rotor, tension nut and spring as a unit.

2. The device as set forth in claim 1 wherein said keying means is connected between said projection and said opening means in said tension nut.

3. The device as set forth in claim 1 wherein said keying means is defined by a bifurcated end at the end of said projection and first and second openings forming said opening means in said tension nut; said bifurcated end defining two spaced legs, respectively, passing through said first and second openings, thereby to key said rotor to said tension nut; the portions of said bifurcated end extending beyond said tension nut defining said tool-receiving means.

4. The device as set forth in claim 1 wherein said other end of said rotor has an annular slot surrounding said projection for receiving said compression spring.

5. The device as set forth in claim 2 wherein said projection and said opening means have non-circular and conforming shapes to define said keying means.

6. The device as set forth in claim 5 wherein said projection has a rectangular cross-section.

7. The device as set forth in claim 2 wherein said opening means comprises a slotted opening; said projection having projecting side sections thereon received in said slotted opening.

References Cited
UNITED STATES PATENTS 2,537,985    1/1951    Godbey.
3,071,716    1/1963    Young.

FOREIGN PATENTS 341,986    4/1936    Italy.

LEWIS H. MYERS, *Primary Examiner.*

E. GOLDBERG, *Assistant Examiner.*